(12) United States Patent
Noorzai et al.

(10) Patent No.: US 10,126,832 B2
(45) Date of Patent: Nov. 13, 2018

(54) SPLIT ROTATING KEYBOARD SYSTEM

(71) Applicant: INFINITY KEYBOARD, INC., Moorpark, CA (US)

(72) Inventors: Omar Noorzai, Camarillo, CA (US); Mustafa Noorzai, Moorpark, CA (US); George J. Huang, Rancho Cucamonga, CA (US)

(73) Assignee: INFINITY KEYBOARD, INC., Moorpark, CA (US)

( * ) Notice: Subject to any disclaimer, the term of this patent is extended or adjusted under 35 U.S.C. 154(b) by 0 days.

(21) Appl. No.: 14/858,797

(22) Filed: Sep. 18, 2015

(65) Prior Publication Data
US 2016/0139680 A1    May 19, 2016

Related U.S. Application Data

(60) Provisional application No. 62/079,571, filed on Nov. 14, 2014.

(51) Int. Cl.
*G06F 3/02* (2006.01)
*G06F 3/023* (2006.01)

(52) U.S. Cl.
CPC .......... *G06F 3/0216* (2013.01); *G06F 3/0231* (2013.01)

(58) Field of Classification Search
CPC ... B41J 5/10; B41J 5/105; G06F 3/023; G06F 3/0202; G06F 3/0208; A44B 18/0053; H04M 1/00
See application file for complete search history.

(56) References Cited

U.S. PATENT DOCUMENTS 5,067,834 A    11/1991  Szmanda et al.
5,393,150 A *   2/1995  Fort .................. B41J 5/105
                                                341/20

(Continued)

OTHER PUBLICATIONS

PCT: Notification of Transmittalof the International Search Report and the Written Opinion of the International Searching Authority or the Declaration; PCT/US2015/059766; dated Jan. 22, 2016; 8 pages.

*Primary Examiner* — Lun-Yi Lao
*Assistant Examiner* — Johny Lau
(74) *Attorney, Agent, or Firm* — Stetina Brunda Garred and Brucker

(57) ABSTRACT

A split rotating keyboard system for use in easing muscle strain and mitigating the effects of carpal tunnel syndrome associated with the usage of conventional computer keyboards. The system comprises first and second computer keyboard sections, namely, a left-hand computer keyboard section and a right-hand computer keyboard section. Each respective computer keyboard section is mounted upon a dedicated rotating platform member that is operative to rotate in clockwise and counter-clockwise directions. According to a preferred embodiment, the rotating platform portions upon which the first and second keyboard sections are positioned may be secured upon a base member that is operative to maintain the first and second rotating platform members in fixed relation to one another. Another preferred embodiment includes elements that allow for a partially "spherical" motion upon which the first and second keyboard sections are positioned may be secured upon a base member that is operative to maintain the first and second spherical platform members in fixed relation to one another. Sensors embedded in the members can transmit motion, position, and pressure data back to the receiving device such as a computer, tablet, or gaming console.

9 Claims, 5 Drawing Sheets

(56) References Cited

U.S. PATENT DOCUMENTS

| | | | | |
|---|---|---|---|---|
| 5,428,502 A | * | 6/1995 | Tsai | G06F 3/0202 200/303 |
| 5,625,929 A | * | 5/1997 | Hattori | A44B 18/0053 24/452 |
| 5,662,422 A | * | 9/1997 | Fort | B41J 5/105 400/486 |
| 5,669,722 A | | 9/1997 | Overtyhun et al. | |
| 5,670,991 A | | 9/1997 | Kuo et al. | |
| 7,828,489 B1 | * | 11/2010 | Hargreaves | G06F 3/0208 400/472 |
| 8,155,692 B1 | * | 4/2012 | Roka | H04M 1/0231 455/550.1 |
| 2006/0210340 A1 | | 9/2006 | Atzmon | |
| 2013/0201109 A1 | | 8/2013 | Knighton et al. | |
| 2014/0240238 A1 | | 8/2014 | Norwalk et al. | |

\* cited by examiner

SPLIT ROTATING KEYBOARD SYSTEM

CROSS-REFERENCE TO RELATED APPLICATIONS

The present application claims priority to U.S. Provisional Patent Application Ser. No. 62/079,571, filed Nov. 14, 2014, entitled ROTATIONAL DATA ENTRY DEVICE, the teachings of which are incorporated herein by reference.

STATEMENT RE: FEDERALLY SPONSORED RESEARCH/DEVELOPMENT

Not Applicable

BACKGROUND

The extensive and prolonged use of computer keyboards are recognized as causing numerous health problems, including muscular fatigue, muscular dysfunction, joint and tendon pain, numbness, tingling and the sensation of burning. Along those lines, there is significant medical evidence that suggests a causative relationship between computer keyboard usage and commutative trauma disorders and repetitive strain injuries, such as carpal tunnel syndrome.

In an attempt to mitigate the pain and damage associated with using conventional computer keyboards, attempts have been made to design keyboards that are more ergonomic in nature. Exemplary keyboards include those disclosed in U.S. Pat. No. 5,826,992 to Camacho et al. and U.S. Pat. No. 5,397,189 to Minogue, the teachings of which are expressly incorporated herein by reference.

Other ergonomically designed keyboards seek to minimize muscle fatigue and repetitious strain by dividing the keyboard into two zones such that each zone is designed for each arm to thus enable the wrist to be placed more conveniently. According to such design, the keyboard includes spaced-apart groups of character keys dedicated for use by the left hand and the right hand of a user, respectively. Exemplary of such keyboards include those disclosed in U.S. Pat. No. 5,372,441 to Louis, the teachings of which are expressly incorporated herein by reference.

Despite such attempts to provide a more user-friendly computer keyboard, such prior art keyboards suffer from the drawback of requiring the keyboard to remain in a stationary position while being used. In this regard, despite the fact the keyboard can assume a more comfortable position, the keyboard, and hence the user, must still remain in a static or stationary position that still requires the user's wrist and hands to remain in place for long periods of time. As such, despite being slightly more comfortable, the keyboard users still are prone to repetitious strain and nerve compression due to the fixed position of the keyboard, which does not allow for any type of motion by the user's wrist, hands or fingers that would otherwise be optimal.

As such, there is a substantial need in the art for a computer keyboard system that is not only ergonomic in nature, but further facilitates the ability of the wrist, hands and fingers to enjoy some range of motion while the keyboard is in use. There is likewise a need in the art for such a keyboard system that provides for such a degree of motion that advantageously minimizes muscular fatigue, joint and tendon pain, numbness, tingling and burning sensations associated with prolonged use with static keyboards that are designed to remain in fixed position. There is a further need for such a keyboard system that is of simple construction, exceedingly simple to use, and can be readily manipulated so as to position the keyboard in a manner that provides optimum comfort to a specific user.

BRIEF SUMMARY

The present invention specifically addresses and alleviates the above-identified deficiencies in the art. In this regard, the present invention is directed to a computer keyboard system designed to mitigate the pain and stress associated with the use of conventional computer keyboards. As is well-known, the extensive, prolonged use of computer keyboards or other data input electronic devices has brought about health problems that are associated with the prolonged and enormous amount of tiny and repeated motions of the wrist and fingers of the user in using such keyboard devices. The system of the present invention expressly addresses those concerns by not only providing a superior ergonomic design, but further incorporates rotational movement that can be made by the wrist, fingers and/or forearms of the user to further eliminate the strain, pain and pressure typically produced from prolonged typing motions.

According to a preferred embodiment, a conventional computer keyboard is physically separated into first and second keyboard sections, namely, a first or left-hand keyboard portion and a second or right-hand keyboard portion. As per conventional keyboards, each respective keyboard portion will have a number of dedicated keys corresponding to letters, numbers, symbols, command functions and the like. Such split keyboard designs may take any of a variety of those known in the art, including those disclosed in U.S. Pat. No. 5,612,691 to Murmann et al. entitled ERGONOMIC KEYBOARD; U.S. Pat. No. 7,828,489 to Hargreaves, et al., entitled KEYBOARD WITH A PAIR OF PIVOTABLE KEY MODULES and the keyboard disclosed in United States Patent Publication No. US2008/0002344A1 applied for by Gaskill, entitled ERGONOMIC VISUAL DISPLAY SYSTEM; the teachings of each of which are incorporated herein by reference.

The first and second keyboard portions are positionable upon dedicated rotating platforms, such as the first or left-hand keyboard portion is positionable upon a first rotating platform member and the second or right-hand keyboard portion is positionable upon a second rotating platform member. Each respective rotating platform member has an upper surface operative to receive each respective keyboard portion and operative to rotate about a central axis in either clockwise or counter-clockwise directions. Such rotating upper surface is disposed upon a stationary platform that maintains the rotating platform and keyboard portion positioned thereon in a fixed position. The present invention can also be designed to allow for a partially "spherical" motion similar to a hand on top of a bowling ball (instead of simply rotating in two dimensions). This type of motion can be achieved by different mechanical means, including but not limited to the use of a spherical surface, a socket and ball joint, a spring or multiple springs, or a multi-part stem assembly.

In order to maintain the first and second keyboard portions in fixed relation to one another as positioned upon the dedicated rotating platforms, the present invention further contemplates that the stationary base platform of each respective rotating platforms will have anchor mechanisms formed on the underside thereof that are detachably interconnectable with a base member. As contemplated, each rotating platform member will be detachably fastenable to the base member such that the rotating platforms with keyboard portions positioned thereon will be maintained at a desired distance relative one another so as to suit the particular needs of a given individual.

To facilitate that interconnection, it is contemplated that the base member may be formed as a grid-type structure with a number of recesses operative to interconnect with peg-like members positionable within dedicated ones of the apertures formed upon the grid surface. In one preferred embodiment, the grid system will be formed as a honeycomb-like structure with a plurality of hexagonal shaped apertures operative to receive male hexagonal anchor portions protruding from the underside of each stationary platform of each rotating platform member. By simply inserting the anchor portions into the desired apertures formed upon the base member, each rotating platform member will thus be secured in a desired position as may be selectively chosen by the user.

While in such configuration, the user may input data through the first and second keyboard portions as would occur through normal typing and user input. Unlike conventional keyboard usage, however, the left and right hands of the user are free to type independent of one another and can independently rotate the respective keyboard portions as used by the user's left and right-hands, respectively. Such rotational movement, coupled with the physical separation of the keyboard portions at a desired distance from one another substantially mitigates muscular fatigue, compressive syndromes and the overuse of tendons to a substantially greater degree than prior art keyboard mechanisms. As will be appreciated by those skilled in the art, a variety of variations are contemplated, falling within the scope of the present invention, include various ways of interconnecting the first and second rotating platform members to a base member, as well as the interconnection by which the keyboard may be connected to a given computer, which may be either through a hard wire or a wireless connection. Those modifications, plus numerous others such as the addition of wrist-supporting apparatus to either the base member or the rotating portion, are believed to be within the scope of the present invention.

BRIEF DESCRIPTION OF THE DRAWINGS

These as well as other features of the present invention will become more apparent upon reference to the drawings.

DETAILED DESCRIPTION

The detailed description set forth below is intended as a description of the presently preferred embodiment of the invention, and is not intended to represent the only form in which the present invention may be implemented or performed. The description sets forth the functions and sequences of steps for practicing the invention. It is to be understood, however, that the same or equivalent functions and sequences may be accomplished by different embodiments and that they are also intended to be encompassed within the scope of the invention.

Figure 1:
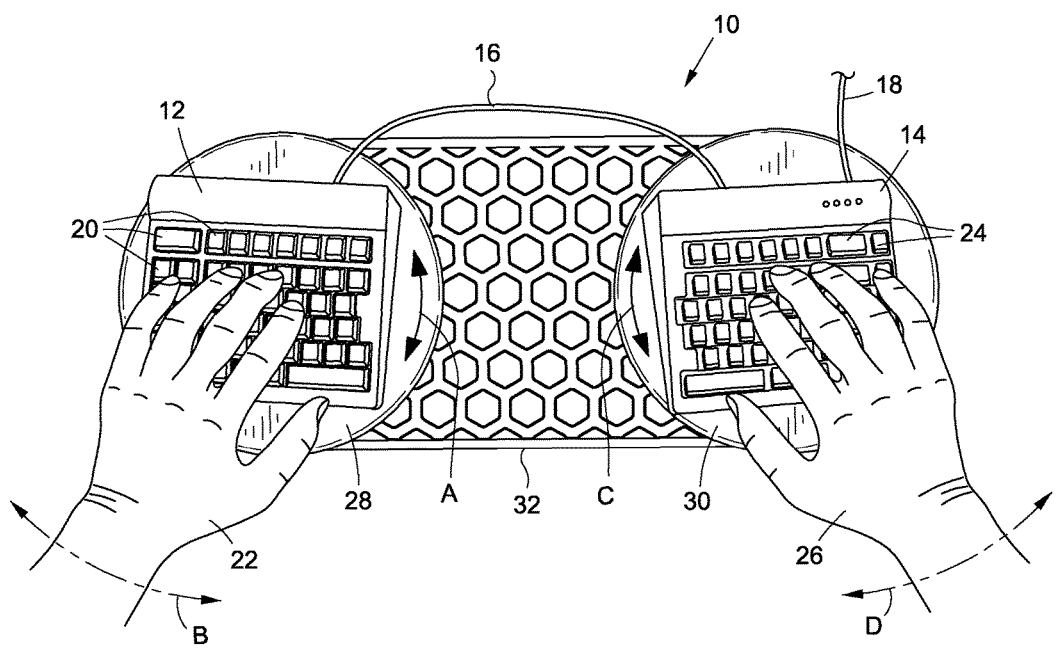
FIG. 1 is a top perspective view of a split rotating keyboard system constructed in accordance with a preferred embodiment of the present invention wherein the keyboard components thereof are shown hard wired to a receiving device such as a computer or gaming console (not shown). The two parts of the keyboard can be connected to each other through a wire (shown) or wirelessly (not shown).

Referring now to the figures, and initially to FIG. 1, there is shown a split rotating keyboard system 10 as constructed in accordance with a preferred embodiment of the present invention. As illustrated, the system 10 comprises a first or left-hand computer keyboard portion 12 that preferably corresponds to the left-hand keyboard portion of a conventional computer keyboard. There is additionally provided a second or right-hand keyboard portion 14 that corresponds to the right portion of a conventional computer keyboard. In this regard, keyboard sections 12,14 may take any of a variety of ergonomic computer keyboards known in the art operative to segregate portions of the keyboard that have keys, namely, keys 20 per left-hand keyboard portion 12 and keys 24 per right-hand keyboard portion 14, that are dedicated to be accessed by the left and right-hands, 22,26, of a keyboard user as shown. Specifically, first or left-hand keyboard portion 12 includes keys 20 that are accessed by the left-hand 22 of a keyboard user whereas second or right-hand keyboard portion 14 includes keys 24 that are operatively manipulated by the right-hand 26 of the keyboard user. Such keyboard designs may take any of a variety of those known in the art, including those disclosed in U.S. Pat. No. 5,612,691 to Murmann et al. entitled ERGONOMIC KEYBOARD; U.S. Pat. No. 7,828,489 to Hargreaves, et al., entitled KEYBOARD WITH A PAIR OF PIVOTABLE KEY MODULES and the keyboard disclosed in United States Patent Publication No. US2008/0002344A1 applied for by Gaskill, entitled ERGONOMIC VISUAL DISPLAY SYSTEM; the teachings of all of which are expressly incorporated by reference. In this regard, any configuration of a keyboard that is operative to have a first left-hand keyboard portion operative to be accessed exclusively by the left-hand of a user and a second detached right-hand keyboard portion operative to be accessed by the right-hand of an individual are deemed to be within the scope of the present invention.

In the embodiment of FIG. 1, keyboard input is fed to a computer (not shown) by a hard wire connection 16,18. As shown, by a hard wire connection 16 connects left-hand keyboard portion 12 with right-hand keyboard portion 14, with hard wire 18 being fed to a computer.

Figure 2:
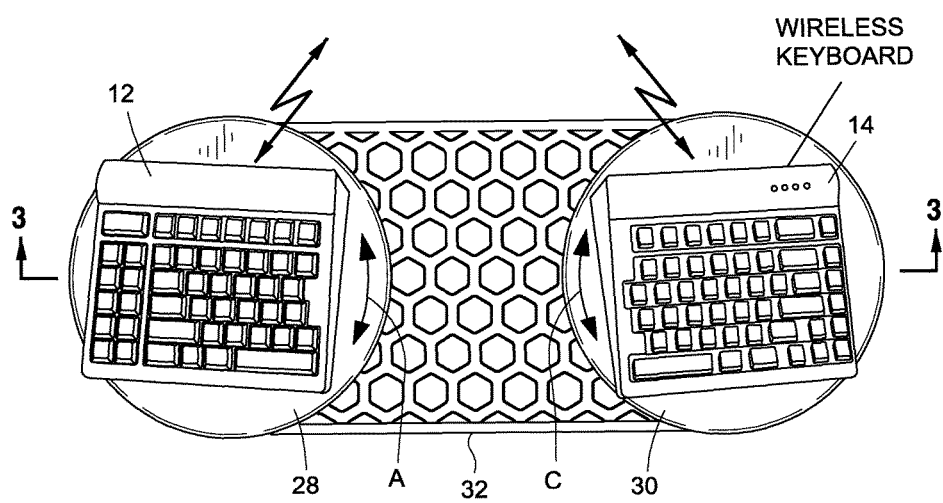
FIG. 2 is the split rotating keyboard system of FIG. 1 shown having a wireless connection to a computer (not shown). The two parts of the keyboard can be connected to each other through a wire (not shown) or wirelessly (shown). The inclines of the keyboards can be adjusted independently by a variety of different methods to suit the desires of the users.

In an alternative embodiment shown in FIG. 2, the respective keyboard portions 12,14 may provide input through a wireless keyboard connection. In this regard, such wireless connection is well-known in the art and an alternative to the use of any type of hard wire connection. Other than the wireless connection, the arrangement of parts is substantially the same as shown in FIG. 1, namely, with first or left-hand keyboard portion 12 being rotatably mounted upon rotating member 28 and second or right-hand keyboard portion 14 being rotatably mounted upon rotating member 30. Rotating platform member 28 is operative to rotate in the manner indicated by the letter A whereas the platform of rotating member 30 is operative to rotate in the manner indicated by the letter C. As illustrated, as discussed more fully herein, rotating platform members 28,30 are optionally mounted upon a base 32.

Unlike conventional computer keyboards, or even ergonomically designed keyboards, this invention contemplates that the left-hand and right-hand keyboard sections 12,14 will be positioned upon dedicated rotating platform members 28,20, as shown. As illustrated, the rotating platform member 28 upon which left-hand keyboard portion 12 is positioned, is operative to rotate in both clockwise and counter-clockwise fashion as indicated by the letter A whereas rotating platform member 30 upon which the right-hand keyboard portion 14 is positioned can rotate in the clockwise and counter-clockwise fashion indicated by the letter C. As will be appreciated by those skilled in the art, the rotating mechanism by which upper platform of rotating members 28,30 operate, will be understood and readily appreciated by those skilled in the art, which may be accomplished by ball bearings and a centrally disposed axis. In this regard, rotating platform members 28,30 are well-known in the art, and are disclosed for example in U.S. Pat. No. 6,790,166; the teachings of which are incorporated by reference.

In use, each respective keyboard portion 12,14, is thus operative to rotate independently of one another depending upon the motion of the user's hands 22,26 as the keyboard portions 12,14 are in use. Specifically, the user's left-hand 22, whether it be by motion of the user's fingers, wrist or forearm is operative to rotate in the direction indicated by the letter B will thus cause the rotating platform 28 to rotate in a corresponding manner as indicated by the letter A. Similarly, rotational movement by the fingers, hand or wrist of the right-hand of the user in the manner indicated by the letter B will thus cause the rotating platform 30 to rotate in the manner indicated by the letter C.

By providing such rotational capability, the user is thus able to prevent repetitious strain, fatigue and nerve compression associated with conventional keyboard usage. Indeed, such rotational movement is believed to be vastly superior to the stationary, ergonomically designed keyboards that are operative to place the keys of the keyboard in a more natural position. As is well-known to those skilled in the art, such ergonomic keyboards are operative to keep such keys in a stationary configuration and do not allow for the ability to provide any type of motion, and in particular rotational motion, that is believed to provide superior relief and substantially mitigate the stress associated with computer keyboard usage, which is a recognized source of workplace injury, particularly with respect to carpal tunnel syndrome.

Figure 3:
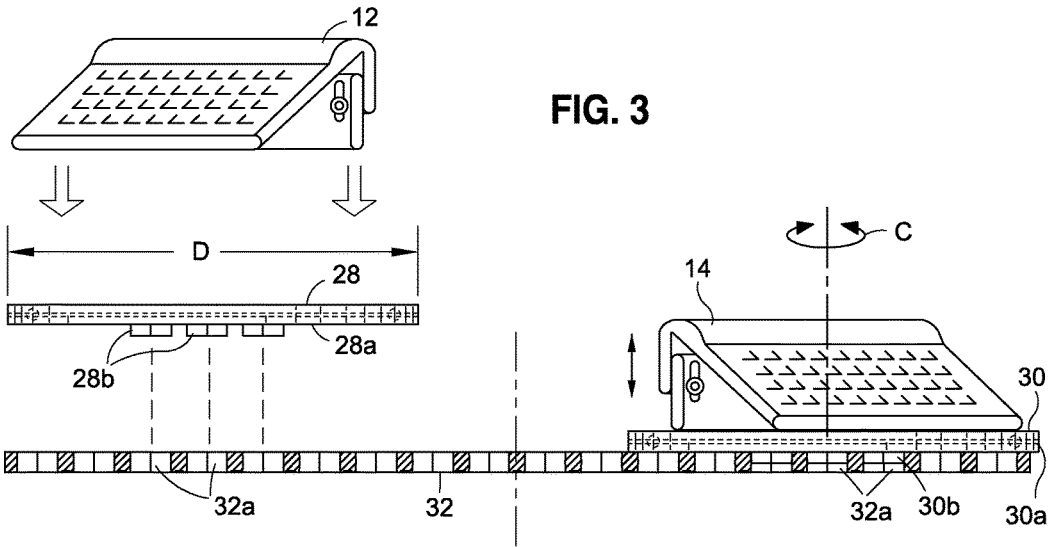
FIG. 3 is a side view, the left side in exploded view, of the split rotating keyboard system of the present invention taken along line 3-3 of FIG. 2 with the various components thereof as shown in interconnected condition. Other accessories (not shown) can attach to any part of the base member when needed, including but not limited to auxiliary lighting, portable electronic devices charging stations, phone or tablet holders, USB hubs or other types of cable accessories, bookstands, clipboards for holding up written notes, etc.
Figure 4:
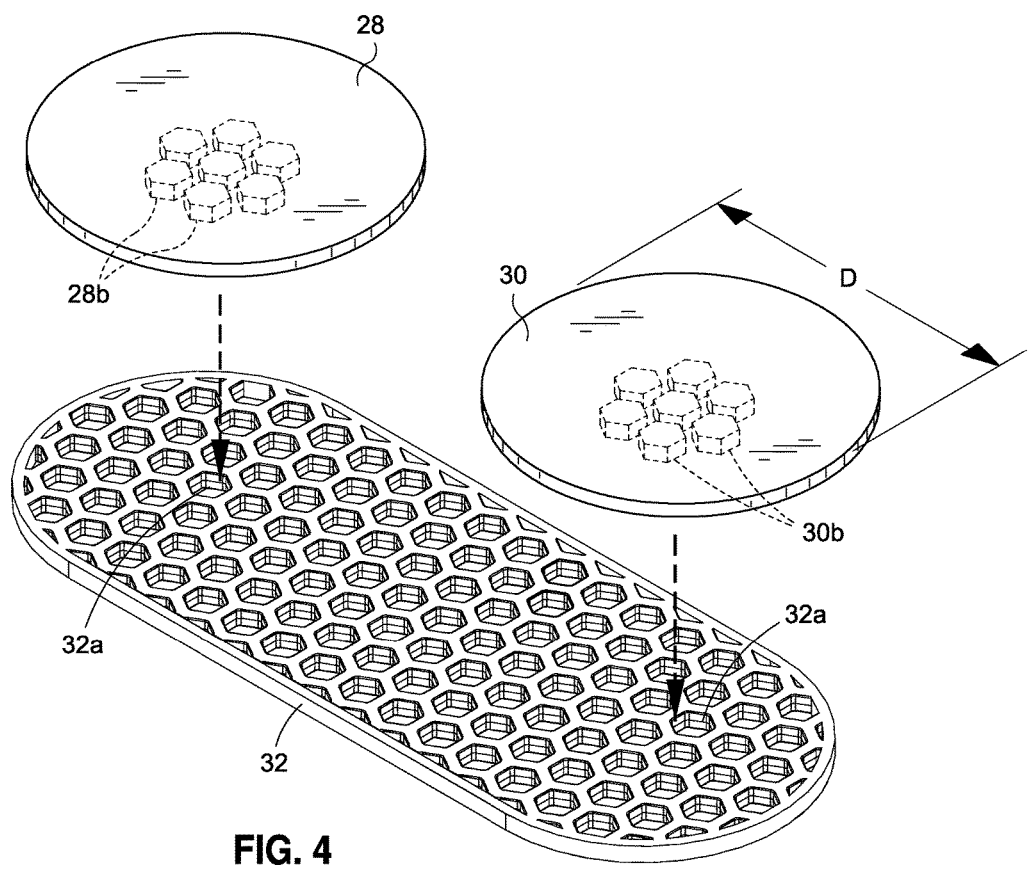
FIG. 4 is a perspective view of the first and second rotating platform members of the split rotating keyboard system of the present invention having interconnecting anchor members formed on the bottom stationary platforms thereof, shown in phantom, as positioned to be interconnected with a base member having a grid system operative to interconnect with the anchoring system.

In order to provide means for maintaining the left-hand keyboard and the right-hand keyboard portions 12,14 in fixed relation to one another, there is further preferably provided a base member 32, upon which the rotating platform members 28,20 may be detachably anchored into position. With respect to the ability of the rotating platform members 28,30 to detachably interconnect with base 32, there is shown in FIG. 3 a preferred embodiment whereby such detachable interconnection is illustrated. As shown, base 32 includes a plurality of apertures, which may preferably take the form of hexagonal apertures arranged in a honeycomb-type grid as shown in FIGS. 1 and 2, within which may be received anchor portions 28b of rotating platform member 28 and anchor portions 30c of rotating platform 30 as illustrated in both FIGS. 3 and 4. In this regard, rotating platform members 28 and 30 are preferably configured to have an upper surface operative to rotate in the manner illustrated as mounted upon stationary platforms 28a,30a beneath which are anchor portions 28b,30b respectively. Such anchor portions 28b,30b formed underneath stationary portions 28a,30a respectively, are operative to be received in dedicated ones of the apertures 32a formed upon base member 32, as shown in both FIGS. 3 and 4. In this regard, and as more clearly seen in FIG. 4, anchor portions 28b of rotating platform member 28 may be selectively positioned such that the anchor portions 28b will nest within a corresponding cluster of apertures 32a and similarly, anchor members 30b of rotating platform member 30 will nest within a corresponding apertures 32a also formed on the base 32. As will be appreciated by those skilled in the art, providing a base 32 having a plurality of apertures thereon for detachably receiving and interconnecting with anchor portions 28b,30b, respectively, the user is thus able to selectively position and re-position each respective rotating platform members 28,20 as may be desired to provide optimum comfort and access to the respective keyboard portions 12,14 as illustrated in FIG. 3.

Figure 5:
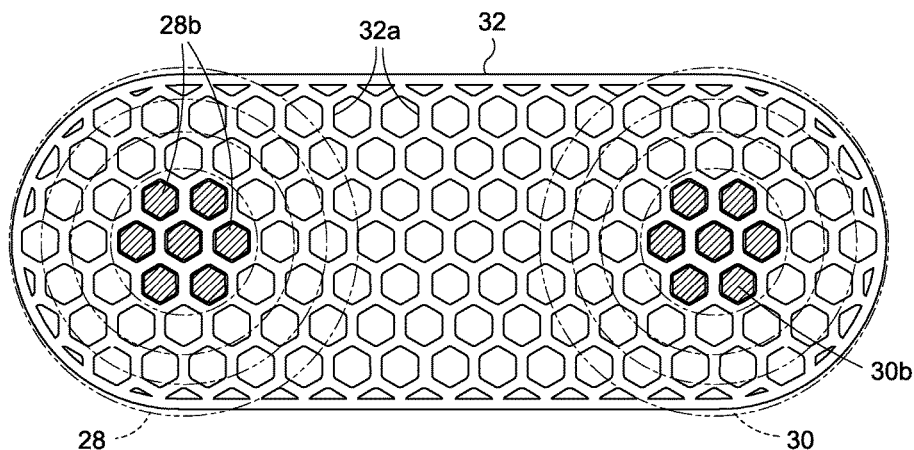
FIG. 5 is a top view of the base members as shown in FIG. 4 with the first and second rotating platform members mounted thereon, the rotating platform members being shown in phantom with the anchoring members thereof shown interconnected to the grid formed upon the base members.

In this regard, the use of the present invention is believed to be exceedingly simple and readily apparent. Along these lines, the user need only position a respective rotating platform members 28,30 in a desired position upon base 32 such that the anchor portions 28b,30b will nest within the desired cluster of apertures 32a formed upon base portion 32. Exemplary of such arrangement can be seen in top view of FIG. 5 whereby anchor portions 28b,30b, respectively of rotating platform members 28,30, shown in phantom, are nested within clusters of apertures 32a formed upon base 32. Once nested in such position, keyboard portions 12,14 may be respectively positioned thereon, as shown in FIG. 3, such that the width of keyboard portions, for example left-hand keyboard portion 12, rests upon width D of rotating platform member 28 and operative to rotate thereupon, such as second or right-hand keyboard portion 14 is shown rotating about axis X in the motion indicated by the letter C. Once positioned thereupon, the keyboard portions may be used as typically would be in order to input data and the like. Users are thus able to selectively locate the keyboard portions on the rotating members 28,30, respectively, as may be desired to minimize stress and fatigue.

Figure 6:
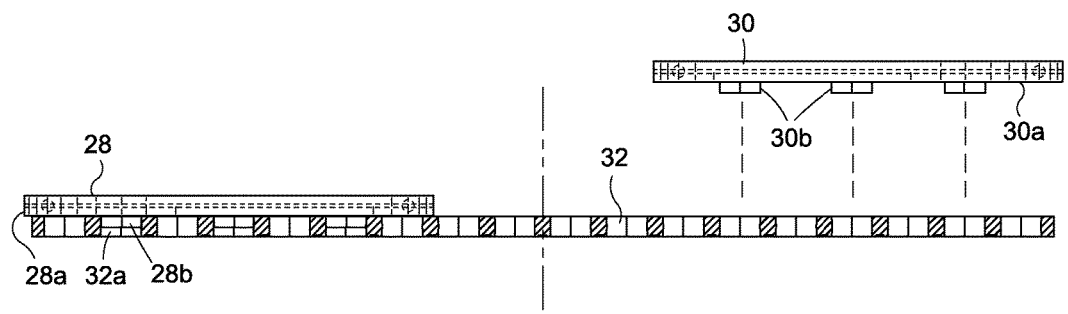
FIG. 6 is a side view showing the interconnectability of the first and second rotating platform members to the grid system formed upon the base member, the first and second platform members having alternative arrangement of anchor members interconnectable to said grid system. Due to the nature of the hexagon lattice, many different arrangements of the male portions can be used to achieve the same result of securing the anchoring members to the base member.
Figure 7:
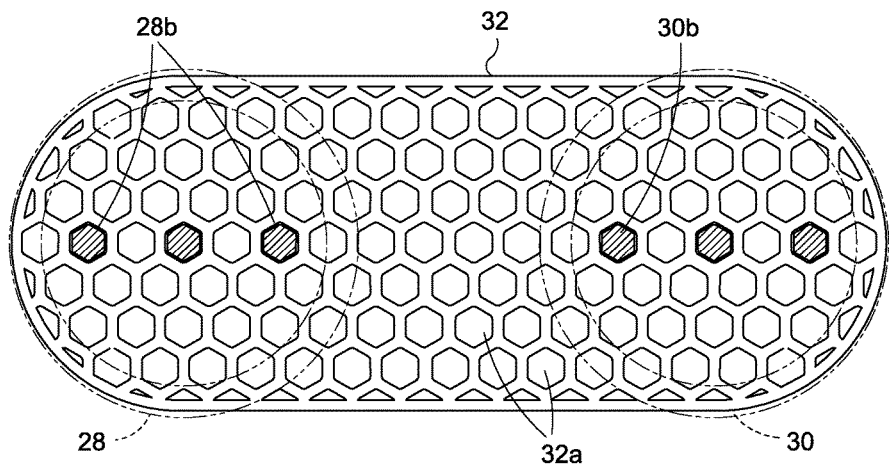
FIG. 7 is a top view of the first and second rotating platform members as shown in FIG. 6 having the alternative anchoring configuration, as mounted upon the grid system of the base portion, the first and second rotating platform members being shown in phantom.

Referring now to FIGS. 6 and 7, and initially to FIG. 6, there is shown a simple variation of the split rotating keyboard system of the present invention having a different arrangement of anchor members 28b,30b, of rotating platform members 28,30, respectively, as shown to engage with apertures 32a of base 32. In this embodiment shown, each respective rotating platform members 28,30 is shown with three anchor members 28b and 30b, formed underneath stationary portions 28a and 30a, as opposed to a cluster of seven anchor members 28b,30b, shown in the embodiment at FIGS. 4 and 5.

An alternative use of a partially spherical arrangement for the rotating platform members 28,30 enables even more range of motion for the hands, including rotation, forward/backward, sideways, and any combination thereof. It can also be designed so additional pressure can be exerted upon the device. The partially spherical motion can be achieved by a variety of mechanical means, including but not limited to the use of a spherical surface, a socket and ball joint, a spring or multiple springs, or a multi-part stem assembly, as would be understood by those skilled in the art. Sensors can also be embedded at appropriate locations about the semispherical structure to supply the motion, position, and pressure data back to the receiving device, which may be a gaming console, computer, tablet and the like. The keyboards may even provide mild electrical stimulation as part of a feedback system, most likely related to gaming.

Sensors located at appropriate points of the rotating platform members 28,30 can also gather information about the positions and motions of and pressures exerted upon the rotating parts and transmit the input data to the receiving device. Such information can be utilized as positional, motion, and pressure data for the purposes of commanding the receiving device or any properly programmed software running on the receiving device to accept and execute certain commands. For instance, the motion of the whole hand on one of the keyboard members on top of the partially spherical surface of the alternative embodiment discussed above could simulate a pointing device like a computer mouse and thus control the position of the pointer or cursor on the screen. Pressure exerted on the keyboard could even be interpreted as the click of a mouse button, if so desired, although the use of an additional button below the space keys would be an easier implementation. The same motion on the other keyboard member could be programmed to indicate something completely different and thus significantly increase the amount of different data a user can give to the receiving device without his hands ever leaving the keyboard. The motion/position/pressure sensors can be activated or de-activated by a special key or button on the keyboard so when such signals are not desired, they are not sent to the receiving device or software.

The keyboard and the members can also include electrical or electronic apparatus to provide electrical stimulation for the purpose of including, but not limited to pain relief, heating, electrical shocks or vibration as part of video game feedback, etc.

As will be readily appreciated by those skilled in the art, by selectively arranging the number of anchor portions 28a,30a of each respective rotating portions, any of a variety of configuration may be designed that enables the respective rotating or spherical platforms 28,30 to be remain in a fixed, stationary position upon base 32.

Figure 8:
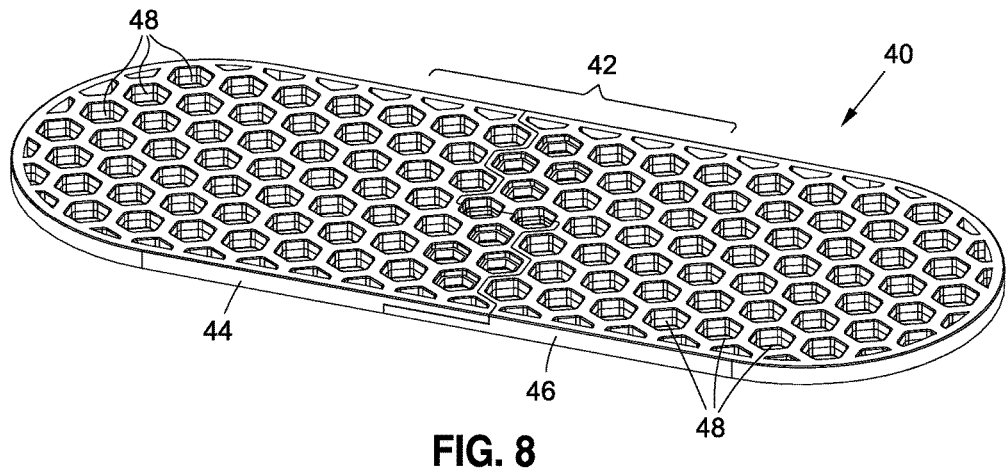
FIG. 8 is a perspective view of a base member upon which the first and second rotating platforms may be mounted, the base member being constructed in accordance with a preferred embodiment and operative to be selectively adjustable.

Referring now to FIGS. 8-11, initially to FIG. 8, there is shown a base platform system 40 as constructed in accordance with a preferred embodiment of the present invention as operative to serve as the base 32 discussed in the earlier figures. While it is expressly contemplated that the base 32 may take any of a variety of forms well-known to those skilled in the art, and as discussed above may be provided with a plurality of apertures formed in a grid-like fashion, the base portion system 40 as shown serves numerous advantages that have not heretofore been available. As illustrated, the system 40 defines an upper platform surface 42 consisting of a plurality of apertures 48 into which complementary male-type anchor members may be inserted and fit into position. As discussed earlier, the apertures are operative to receive anchor members such as 26 formed on platform surface 24, and may also be configured to receive and mount with like anchor devices formed on the underside portions of rotating platform members 14,16 such as 28b, 30b. The apertures 48 are preferably formed as hexagons and formed in a honeycomb-like configuration as disclosed above.

Figure 9:
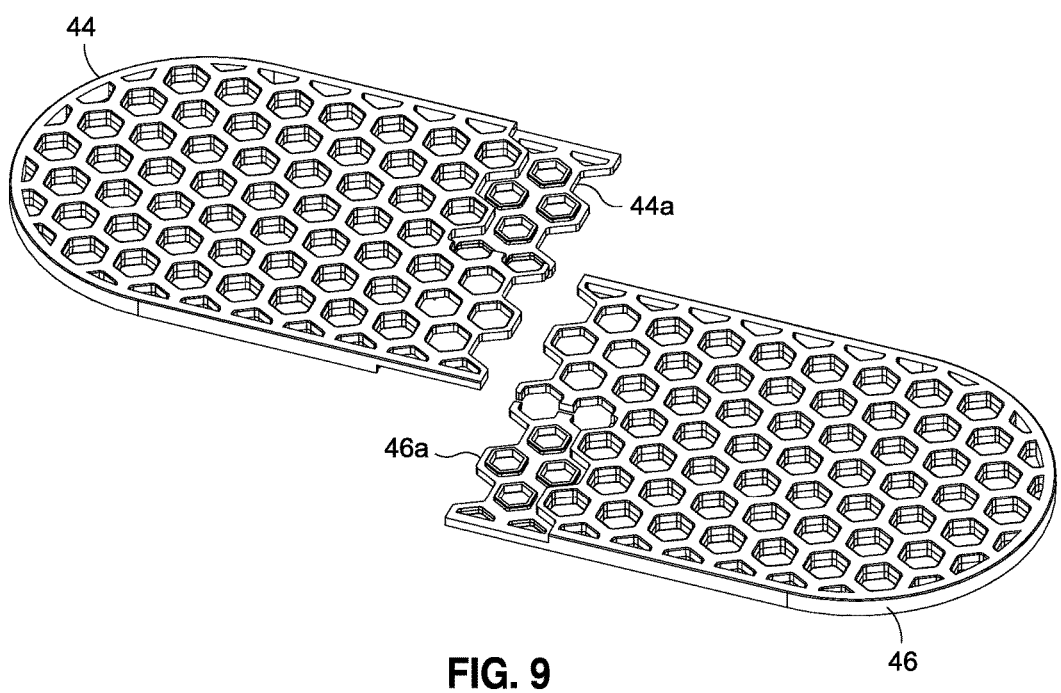
FIG. 9 is a perspective view of the base member of FIG. 7 shown in detached first and second sections.
Figure 10:
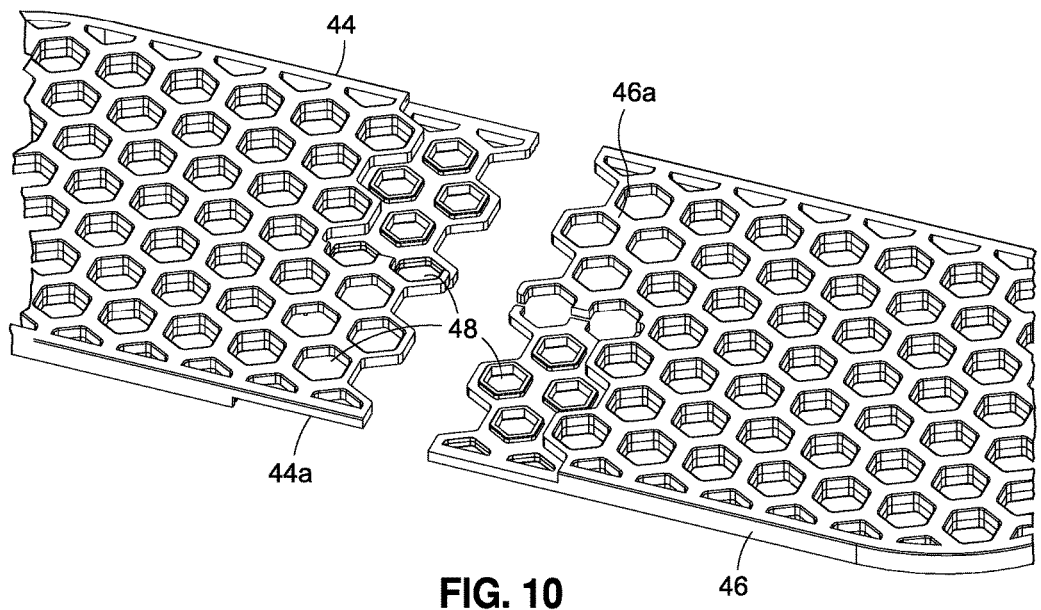
FIG. 10 is a view of the midpoint of the first and second sections depicted in FIG. 9 showing how such first and second sections are operative to interconnect with one another to form the structure of FIG. 8.
Figure 11:
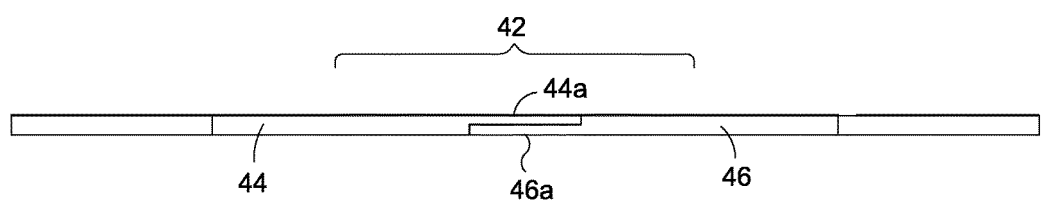
FIG. 11 is a side-view of the base member depicted in FIG. 8 showing the first and second sections interconnected to one another.

The system 40 as shown, in order to provide greater versatility, is preferably divided into a first section 44 and a second section 46 that are detachably interconnectable to one another, as more clearly shown in FIG. 9. In this regard, first portion 44 is provided with an overhang portion 44a that detachably mates with extended under-portion 46a of second section 46. As shown in FIG. 10, the portions 44a,46a are complementary in nature and can be selectively reattached to produce a wider upper surface 42 as may be desired. In the embodiment shown, the width of the upper surface 42 may be adjusted by one to two rows apertures 48 while still enabling the first and second sections 44,46 to mate with and become attached with anchor members disposed there-underneath or there-over along interconnecting portions 44a,46a, as will be understood by those skilled in the art. To the extent it is not desired to expand the width of upper surface 42, the first and second sections 44,46 may be interconnected with one another in the manner shown in FIG. 11 such that portions 44a,46a are completely attached to one another.

Additional modifications and improvements of the present invention may also be apparent to those of ordinary skill in the art. Thus, the particular combination of parts and steps described and illustrated herein is intended to represent only certain embodiments of the present invention and is not intended to serve as limitations of alternative devices and methods within the spirit and scope of the invention.

What is claimed is:
1. A split rotating keyboard system comprising:
a first left-handed keyboard portion having a plurality of computer keys formed thereon for manipulation by the left-hand of a computer keyboard user, said left-hand keyboard portion being mounted upon a first dedicated rotating platform member having a first anchor portion;

a first right-handed keyboard portion having a plurality of computer keys formed thereon for manipulation by the right-hand of a computer keyboard user, said right-hand keyboard portion being mounted upon a second dedicated rotating platform member having a second anchor portion;

a sensor associated with at least one of the first or second rotating platform members, the sensor being operative to detect at least a rotational position of the at least one rotating platform members with which the sensor is associated;

a planar, grid-type base extending in a first longitudinal direction and a second transverse direction perpendicular to the first longitudinal direction, the planar, grid-type base having a plurality of apertures complimentary in shape and configuration to said first and second anchor portions for receiving said first and second anchor portions and allowing adjustment of said first and second rotating platform members relative to the base in both the first longitudinal direction and the second transverse direction, each of said apertures having a hexagonal shape, the plurality of apertures cooperating to define a planar honeycomb-type structure;

wherein the input data of the left-hand and right-hand keyboard portions are operatively transmitted to a computer or any receiving device; and wherein the keyboard system is operative to transmit the detected rotational position of the first or second rotating platform members to a computer or any receiving device.

2. The system of claim 1 wherein said first keyboard portion is operative to rotate in clockwise and counter-clockwise motions about a central axis, and second keyboard portion is operative to rotate in clockwise and counter-clockwise motion about a central axis.

3. The system of claim 1 wherein said first and second keyboard portions are operative to rotate and move in all directions on top of a partially spherical surface.

4. The system of claim 1 wherein said first and second keyboard portions are wirelessly connected to said computer.

5. The system of claim 1 wherein said first and second keyboard portions are hardwired to a computer.

6. The system of claim 1 wherein said base is operative to maintain said first rotating platform member upon which said left-hand keyboard portion is positioned in fixed relation to said second rotating platform member upon which said right-hand keyboard portion is positioned.

7. The system of claim 1, wherein the sensor is operative to detect a pressure imparted by a computer keyboard user to the at least one rotating platform members with which the sensor is associated, the keyboard system being operative to transmit the detected pressure to a computer or any receiving device.

8. The system of claim 1, wherein the sensor is operative to detect a motion of the at least one rotating platform members with which the sensor is associated, the keyboard system being operative to transmit the detected motion to a computer or any receiving device.

9. A split rotating keyboard system comprising:

a planar base extending in a first longitudinal direction and a second transverse direction perpendicular to the first longitudinal direction;

a first rotating platform member having a first anchor portion detachably connectable with the planar base and a first rotatable portion rotatable relative to the base;

a second rotating platform member having a second anchor portion detachably connectable with the planar base and a second rotatable portion rotatable relative to the base, the position of the second rotating platform member being adjustable relative to the first rotating platform member in the first longitudinal direction and the second transverse direction;

a sensor associated with at least one of the first or second rotating platform members, the sensor being operative to detect at least a rotational position of the at least one rotating platform members with which the sensor is associated;

a left-handed keyboard portion having a plurality of computer keys formed thereon for manipulation by the left-hand of a computer keyboard user, the left-hand keyboard portion being positioned on the first rotatable portion; and a right-handed keyboard portion having a plurality of computer keys formed thereon for manipulation by the right-hand of a computer keyboard user, the right-hand keyboard portion being positioned on the second rotatable portion;

the planar base including a plurality of hexagonal apertures formed therein which cooperate to define a planar honeycomb-type structure, the plurality of apertures being sized and structured to receive respective portions of the first anchor portion and the second anchor portion, keyboard system is operative to transmit the detected rotational position of the first or second rotating platform members to a computer or any receiving device.

* * * * *